United States Patent
Spiro et al.

(10) Patent No.: US 9,456,000 B1
(45) Date of Patent: Sep. 27, 2016

(54) SYSTEMS, METHODS, USER INTERFACES, AND COMPUTER-READABLE MEDIA FOR INVESTIGATING POTENTIAL MALICIOUS COMMUNICATIONS

(71) Applicant: Palantir Technologies Inc., Palo Alto, CA (US)

(72) Inventors: Ezra Spiro, New York City, NY (US); Joseph Staehle, New York City, NY (US); Andrew Levine, New York City, NY (US); Juan Ricafort, New York City, NY (US); Alvaro Morales, New York City, NY (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 15/072,174

(22) Filed: Mar. 16, 2016

Related U.S. Application Data

(60) Provisional application No. 62/202,104, filed on Aug. 6, 2015.

(51) Int. Cl.
*H04L 29/06* (2006.01)
*G06F 3/0484* (2013.01)
(Continued)

(52) U.S. Cl.
CPC .......... *H04L 63/1425* (2013.01); *G06F 3/0482* (2013.01); *G06F 3/04842* (2013.01); *G06F 17/2705* (2013.01); *G06F 17/30598* (2013.01); *H04L 63/1416* (2013.01)

(58) Field of Classification Search
CPC ........... H04L 63/1425; H04L 63/1416; G06F 3/0482; G06F 3/04842; G06F 17/2705; G06F 17/30598
See application file for complete search history.

(56) References Cited

U.S. PATENT DOCUMENTS 6,374,251 B1 4/2002 Fayyad et al.
6,567,936 B1 5/2003 Yang et al.
(Continued)

FOREIGN PATENT DOCUMENTS

EP 1191463 3/2002
EP 2555153 2/2013
(Continued)

OTHER PUBLICATIONS

G. Gu, R. Perdisci, J. Zhang, W. Lee "BotMiner: clustering analysis of network traffic for protocol-and-structure-independent botnet detection", USENIX Security Symposium, 2008, 17 pages.*
(Continued)

*Primary Examiner* — Catherine Thiaw
(74) *Attorney, Agent, or Firm* — Knobbe, Martens, Olson & Bear LLP

(57) ABSTRACT

A data analysis system receives potentially undesirable electronic communications and automatically groups them in computationally-efficient data clusters, automatically analyze those data clusters, automatically tags and groups those data clusters, and provides results of the automated analysis and grouping in an optimized way to an analyst. The automated analysis of the data clusters may include an automated application of various criteria or rules so as to generate an ordered display of the groups of related data clusters such that the analyst may quickly and efficiently evaluate the groups of data clusters. In particular, the groups of data clusters may be dynamically re-grouped and/or filtered in an interactive user interface so as to enable an analyst to quickly navigate among information associated with various groups of data clusters and efficiently evaluate those data clusters.

20 Claims, 15 Drawing Sheets

(51) Int. Cl.
*G06F 3/0482* (2013.01)
*G06F 17/27* (2006.01)
*G06F 17/30* (2006.01)

(56) References Cited

U.S. PATENT DOCUMENTS

| | | | |
|---|---|---|---|
| 8,600,872 | B1 | 12/2013 | Yan |
| 8,713,018 | B2 | 4/2014 | Knight et al. |
| 8,818,892 | B1* | 8/2014 | Sprague ............ G06F 17/30412 705/35 |
| 8,839,434 | B2 | 9/2014 | McDougal et al. |
| 9,021,260 | B1 | 4/2015 | Falk et al. |
| 9,043,894 | B1* | 5/2015 | Dennison ............. G06F 21/566 726/11 |
| 9,202,249 | B1* | 12/2015 | Cohen .................... G06Q 40/12 |
| 9,230,280 | B1 | 1/2016 | Maag et al. |
| 9,344,447 | B2 | 5/2016 | Cohen et al. |
| 9,367,872 | B1 | 6/2016 | Visbal et al. |
| 2006/0095521 | A1 | 5/2006 | Patinkin |
| 2008/0133567 | A1 | 6/2008 | Ames et al. |
| 2008/0148398 | A1 | 6/2008 | Mezack et al. |
| 2008/0288425 | A1 | 11/2008 | Posse et al. |
| 2009/0044279 | A1 | 2/2009 | Crawford et al. |
| 2010/0077481 | A1* | 3/2010 | Polyakov ............. G06F 21/568 726/24 |
| 2010/0306029 | A1 | 12/2010 | Jolley |
| 2011/0087519 | A1 | 4/2011 | Fordyce, III et al. |
| 2011/0093327 | A1 | 4/2011 | Fordyce, III et al. |
| 2011/0167493 | A1 | 7/2011 | Song et al. |
| 2011/0178842 | A1 | 7/2011 | Rane et al. |
| 2011/0225650 | A1 | 9/2011 | Margolies et al. |
| 2011/0231223 | A1 | 9/2011 | Winters |
| 2011/0314546 | A1* | 12/2011 | Aziz ....................... G06F 21/56 726/24 |
| 2012/0131107 | A1* | 5/2012 | Yost ..................... G06Q 10/107 709/206 |
| 2013/0185320 | A1* | 7/2013 | Iwasaki ............... G06F 17/2235 707/758 |
| 2014/0283067 | A1* | 9/2014 | Call ..................... H04L 63/1425 726/23 |
| 2014/0331119 | A1* | 11/2014 | Dixon ................... H04L 63/168 715/234 |
| 2014/0379812 | A1* | 12/2014 | Bastide, II .............. H04L 51/12 709/206 |
| 2015/0067533 | A1* | 3/2015 | Volach ................. G06Q 10/107 715/752 |
| 2016/0034470 | A1 | 2/2016 | Sprague et al. |

FOREIGN PATENT DOCUMENTS

| | | |
|---|---|---|
| EP | 2911078 | 8/2015 |
| EP | 2963577 | 1/2016 |
| WO | WO 2008/011728 | 1/2008 |
| WO | WO 2008/113059 | 9/2008 |
| WO | WO 2013/126281 | 8/2013 |

OTHER PUBLICATIONS

"A Word About Banks and the Laundering of Drug Money," Aug. 18, 2012, http://www.golemxiv.co.uk/2012/08/a-word-about-banks-and-the-laundering-of-drug-money/

Alfred, Rayner "Summarizing Relational Data Using Semi-Supervised Genetic Algorithm-Based Clustering Techniques", Journal of Computer Science, 2010, vol. 6, No. 7, pp. 775-784.

Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.

Keylines.com, "KeyLines Datasheet," Mar. 2014, http://keylines.com/wp-content/uploads/2014/03/KeyLines-datasheet.pdf downloaded May 12, 2014 in 2 pages.

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

"Money Laundering Risks and E-Gaming: A European Overview and Assessment," 2009, http://www.cf.ac.uk/socsi/resources/Levi_Final_Money_Laundering_Risks_egaming.pdf.

Nolan et al., MCARTA: A Malicious Code Automated Run-Time Analysis Framework, Homeland Security, 2012 IEEE Conference on Technologies for, Nov. 13, 2012, pp. 13-17.

Perdisci et al., "Behavioral Clustering of HTTP-Based Malware and Signature Generation Using Malicious Network Traces," USENIX, Mar. 18, 2010, pp. 1-14.

"Potential Money Laundering Warning Signs," snapshot taken 2003, https://web.archive.org/web/20030816090055/http://finsolinc.com/Anti-Money%20Laundering%20Training%20Guides.pdf Shah, Chintan, "Periodic Connections to Control Server Offer New Way to Detect Botnets," Oct. 24, 2013 in 6 pages, http://www.blogs.mcafee.com/mcafee-labs/periodic-links-to-control-server-offer-new-way-to-detect-botnets.

Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.

Symantec Corporation, "E-Security Begins with Sound Security Policies," Announcement Symantec, Jun. 14, 2001.

"Using Whois Based Geolocation and Google Maps API for Support Cybercrime Investigations," http://wseas.us/e-library/conferences/2013/Dubrovnik/Telecirc/Telecirc-32.pdf.

Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.

Notice of Allowance for U.S. Appl. No. 14/139,628 dated Jun. 24, 2015.

Notice of Allowance for U.S. Appl. No. 14/139,640 dated Jun. 17, 2015.

Notice of Allowance for U.S. Appl. No. 14/139,713 dated Jun. 12, 2015.

Notice of Allowance for U.S. Appl. No. 14/264,445 dated May 14, 2015.

Notice of Allowance for U.S. Appl. No. 14/278,963 dated Sep. 2, 2015.

Notice of Allowance for U.S. Appl. No. 14/323,935 dated Oct. 1, 2015.

Notice of Allowance for U.S. Appl. No. 14/473,552 dated Jul. 24, 2015.

Notice of Allowance for U.S. Appl. No. 14/473,860 dated Feb. 27, 2015.

Notice of Allowance for U.S. Appl. No. 14/473,860 dated Jan. 5, 2015.

Notice of Allowance for U.S. Appl. No. 14/486,991 dated May 1, 2015.

Notice of Allowance for U.S. Appl. No. 14/579,752 dated Apr. 4, 2016.

Notice of Allowance for U.S. Appl. No. 14/616,080 dated Apr. 2, 2015.

Official Communication for European Patent Application No. 14159535.5 dated May 22, 2014.

Official Communication for European Patent Application No. 15155845.9 dated Oct. 6, 2015.

Official Communication for European Patent Application No. 15156004.2 dated Aug. 24, 2015.

Official Communication for European Patent Application No. 15175151.8 dated Nov. 25, 2015.

Official Communication for European Patent Application No. 15180515.7 dated Dec. 14, 2015.

Official Communication for Great Britain Application No. 1404457.2 dated Aug. 14, 2014.

Official Communication for U.S. Appl. No. 14/139,628 dated Jan. 5, 2015.

Official Communication for U.S. Appl. No. 14/139,640 dated Dec. 15, 2014.

(56) References Cited

OTHER PUBLICATIONS

Official Communication for U.S. Appl. No. 14/139,713 dated Dec. 15, 2014.
Official Communication for U.S. Appl. No. 14/251,485 dated Oct. 1, 2015.
Official Communication for U.S. Appl. No. 14/264,445 dated Apr. 17, 2015.
Official Communication for U.S. Appl. No. 14/278,963 dated Jan. 30, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/473,552 dated Feb. 24, 2015.
Official Communication for U.S. Appl. No. 14/473,860 dated Nov. 4, 2014.
Official Communication for U.S. Appl. No. 14/486,991 dated Mar. 10, 2015.
Official Communication for U.S. Appl. No. 14/518,757 dated Dec. 1, 2015.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/579,752 dated Dec. 9, 2015.
Official Communication for U.S. Appl. No. 14/581,920 dated Mar. 1, 2016.
Official Communication for U.S. Appl. No. 14/581,920 dated Jun. 13, 2016.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Apr. 5, 2016.
Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/857,071 dated Mar. 2, 2016.
Restriction Requirement for U.S. Appl. No. 14/857,071 dated Dec. 11, 2015.

\* cited by examiner

⚠ 8 submissions with subjects like 'Review Secured Access'
Triggered by PHISHING: TIER:0 #492421 [OPEN]

[Take Action ▼] [Export...▼]

🔍 Submissions contain a total of 61 URLs.
🔍 Submissions contain a total of 1 attachments.
🔍 This campaign was reported more than once
🔍 2 URLs were found in a Domain/URL blacklist ♟ ASSIGNED TO
   Unassigned 👁 WATCHED BY
   Unwatched

| Summary | Messages (8) | Clickers (38) | ProofPoint Recipients (246) | |
|---|---|---|---|---|
| drenk.com.br/up | | | | |
| buntyllc.com/about.htmt | | | | |
| makedonyadauniversite.com/images/menu/art/index.php | | | | |
| tinyurl.com/k4ha7yb | | | | |
| myuif.com/omahmood | | | | |
| linkedon.com/pub/ahad-choudhury/3/4b5/888 | | | | |
| tinyurl.com/ozhgpzw | | | | |
| smartfeet.net/ahit/mine0/2014/index.php | | | | |
| tinyurl.com/peflow2q | | | | |
| legacysir.com | | | | |
| rotisseriebuongusto.com.br/media/securemsg/art/index.php | | | | |
| BLACKLISTED URLS (2) | | | | BlackList |
| geekadelphia.com/business/index.php | | | | RiskIQ BlackList |
| milasteknik.com.tr/index.php | | | | RiskIQ BlackList |
| ATTACHMENTS (1) | | | | |
| 2C1B060229A914F2A90A8C7E3BE6EB40 | | | | |
| SUBMITTERS (65) | | | | |

*FIG. 9*

⚠ 8 submissions with subjects like 'Review Secured Access'
Triggered by PHISHING: TIER:0 #492421 [OPEN]

[Take Action ▾] [Export... ▾]

○ Submissions contain a total of 61 URLs.
○ Submissions contain a total of 1 attachments.
○ This campaign was reported more than once
○ 2 URLs were found in a Domain/URL blacklist ⌂ ASSIGNED TO
　Unassigned ◉ WATCHED BY
　Unwatched

| Summary | Messages (8) | Clickers (38) | ProofPoint Recipients (246) |

SUBMISSION 4:

I received the below email from out client, is this phishing?

Thanks

From: Tina Strauss (mailto:tina.strauss@hmail.com)
Sent:Friday, March 27, 2015 1:13PM
Subject: Review Secured Access Hello.
　　I've shared on-line with you using,
　　　　Drop Box Online PDF View Folder Enjoy!

Google Drive: Hace all your files within reach from any device. The Drop Team

*FIG. 10*

⚠ 8 submissions with subjects like 'Review Secured Access'
Triggered by PHISHING: TIER:0 #492421 [OPEN]

[Take Action ▾] [Export... ▾]

- Submissions contain a total of 61 URLs.
- Submissions contain a total of 1 attachments.
- This campaign was reported more than once
- 2 URLs were found in a Domain/URL blacklist 👤 ASSIGNED TO Unassigned
◉ WATCHED BY Unwatched Summary | Messages (8) | Clickers (38)

ProofPoint Recipients (246)

| | NAME | | ID | | BAND |
|---|---|---|---|---|---|
| afirc.net/train/LoginVerification.php | | | | | |
| | Colquhoun, Paula F. | | abt1khl | | 0 |
| | Reynolds, Shawna K. | | abn0tq0 | | 0 |
| legacysir.com/maine-realtors.taf | NAME | | ID | | BAND |
| | Reynell, Micky R. | | zycvwsx | | 1 |
| nutterbearcards.com/favicon.ico | NAME | | ID | | BAND |
| | Dane, jeanna C. | | zyy1z42 | | 1 |
| legacysir.com/images/bottomtile.gif | NAME | | ID | | BAND |
| | Sutton, Vanessa D. | | zy0wbxx | | 1 |
| cres-americas.com/page/art/index_files/style.htm | NAME | | ID | | BAND |
| | Foster, Derrick S. | | ablzxs8 | | 2 |
| sdocolombia.com/favicon.ico | NAME | | ID | | BAND |
| | Brooke, Rex H. | | abwz4bt | | 2 |

*FIG. 11*

⚠ 8 submissions with subjects like 'Review Secured Access'
Triggered by PHISHING: TIER:0 #492421 [OPEN]

[Take Action ▼] [Export... ▼]

○ Submissions contain a total of 61 URLs.
○ Submissions contain a total of 1 attachments.
○ This campaign was reported more than once
○ 2 URLs were found in a Domain/URL blacklist ⌂ ASSIGNED TO
  Unassigned ◉ WATCHED BY
  Unwatched

| Summary | Messages (8) | Clickers (38) | ProofPoint Recipients (246) |

| NAME | ID | EMAIL | BAND |
|---|---|---|---|
| Colquhoun, Paula F. | abt1khl | pfc24@example.org | 0 |
| Reynolds, Shawna K. | abn0tq0 | skr45@example.org | 0 |
| Reynell, Micky R. | zycvwsx | mrr56@example.org | 1 |
| Dane, Jeanna C. | zyy1z42 | jcd86@example.org | 1 |
| Sutton, Vanessa D. | zy0wbxx | vds71@example.org | 1 |
| Foster, Derrick S. | ablzxs8 | dsf42@example.org | 2 |
| Brooke, Rex H. | abwz4bt | rxb79@example.org | 2 |
| Chance, Laurence D. | zyv25yz | ldc76@example.org | 2 |

*FIG. 12*

⚠ 8 submissions with subjects like 'Review Secured Access'
Triggered by PHISHING: TIER:0 #492421 [OPEN]                                    Take Action ▾    Export... ▾

| EMAIL | MESSAGEID | TIMESTAMP | SESSIONID | JUDGMENT | SENDER_NONFT | SUBJEC |
|---|---|---|---|---|---|---|
| 2014/11/06 09:57 | eA6Ev6dY004530 | 2014 Nov 6 14:57:06 | 1qt097u488 | notspam | linezmark@hmail.com | Re:Fwd |
| 2014/11/06 15:23 | eA6KN6do002778 | 2014 Nov 6 20:23:07 | 1qgd3km7hm | notspam | adam@camdf.com | FW: con |
| 2014/11/06 17:50 | eA6Mogra000718 | 2014 Nov 6 22:50:42 | 1qtt67fttj | notspam | nicole.dinino@bluefine.com | 6723 N. |
| 2014/11/07 18:54 | eA7NsWSk007454 | 2014 Nov 7 23:54:33 | 1qggke9cmt | notspam | linezmark@hmail.com | Re:Foot |
| 2014/11/08 09:43 | eA8Eh74A014933 | 2014 Nov 8 14:43:07 | 1qgdxmmprj | notspam | linezmark@hmail.com | Re:Foot |
| 2014/11/08 18:07 | eA8N7EUo030778 | 2014 Nov 8 23:07:14 | 1qh5rkk89v | notspam | mhuffman@huffmanco.com | Re: Alan |
| 2014/11/08 19:02 | eA902x68002034 | 2014 Nov 9 00:02:59 | 1qh5t8kb73 | notspam | linezmark@hmail.com | Re: Pote |
| 2014/11/08 19:29 | eA90TWBa006495 | 2014 Nov 9 00:29:32 | 1qhnxjhtyy |  | mhuffman@huffmanco.com |  |
| 2014/11/10 11:43 | eAAGh8wY017446 | 2014 Nov 10 16:43:09 | 1qjxynk0jt | notspam | davidstindner@hmail.com | Commo |
| 2014/11/10 12:00 | eAAH0JU9010153 | 2014 Nov 10 17:00:19 | 1qh5t34d3k | notspam | pmoisan@jmmcom.com | Review |
| 2014/11/10 16:21 | eAALLAEa022196 | 2014 Nov 10 21:21:11 | 1qh9d3vqp9 | notspam | jblewitt@mission.com | Review |
| 2014/11/10 16:23 | eAALNVxX030381 | 2014 Nov 10 21:23:31 | 1qjqhkga5 | notspam | jblewitt@mission.com | Review |
| 2014/11/10 16:29 | eAALTKQL005252 | 2014 Nov 10 21:29:21 | 1qh5t89b57 | notspam | jblewitt@mission.com | Review |
| 2014/11/10 16:29 | 1qca9jy3cp-1 | 2014 Nov 10 21:29:22 | 1qce9jy3cp |  | jblewitt@mission.com |  |
| 2014/11/11 08:20 | eABDK9CV005123 | 2014 Nov 11 13:20:09 | 1qk3wwpcrc | notspam | linezmark@hmail.com |  |
| 2014/11/12 07:24 | eACCDAYo007142 | 2014 Nov 12 12:24:10 | 1qkqnurd5b | notspam | amalia915@hmail.com | Review |
| 2014/11/12 07:24 | eACC09fB022201 | 2014 Nov 12 12:24:10 | 1qk558add3x | notspam | amalia915@hmail.com | Review |
| 2014/11/12 11:19 | eACGJJqD014593 | 2014 Nov 12 16:19:20 | 1qma4whdsj | notspam | ahad.choudhury@plus.com | Point PI |
| 2014/11/12 12:09 | eACH9QTw005109 | 2014 Nov 12 17:09:27 | 1qk58akv0e | notspam | ahad.choudhury@plus.com | Re: Poin |
| 2014/11/12 14:17 | eACJHoFU001691 | 2014 Nov 12 19:17:50 | 1qksrsunpq | notspam | amalia915@hmail.com | I have b |

*FIG. 13*

⚠ 8 submissions with subjects like 'Review Secured Access'
Triggered by PHISHING: TIER:0 #492421 [OPEN]

♀ ASSIGNED TO
  Unassigned

⊙ WATCHED BY
  Unwatched

[Take Action ▼]

Phishing
Scam
Spam
Malicious
In Progress
Legitimate
Reassign to....
Unassign
Watch
Unwatch

[Export... ▼]

○ Submissions contain a total of 61 URLs.
○ Submissions contain a total of 1 attachments.
○ This campaign was reported more than once
○ 2 URLs were found in a Domain/URL blacklist

| Summary | Messages (8) | Clickers (38) | ProofPoint Recipients (246) |

SENDERS (47)
mhuffman@thehuffmanco.com
amalia915@hmail.com
adam@camdf.com
ann750@hmail.com
davidlindner@hmail.com
matt@lotfey.com
amdlopez@hmail.com

*FIG. 14A*

| Phishing | 1 Flag |
|---|---|
| Why are you taking action on this flag?<br>☐ Campaign was found to be phishing<br>☐ Other | |
| Add a note... | |
| PHISHING | |

*FIG. 14B*

SYSTEMS, METHODS, USER INTERFACES, AND COMPUTER-READABLE MEDIA FOR INVESTIGATING POTENTIAL MALICIOUS COMMUNICATIONS

INCORPORATION BY REFERENCE

This application claims priority to U.S. Provisional Patent Application No. 62/202,104, filed Aug. 6, 2015, which is incorporated by reference in its entirety. The disclosure below also references various features of U.S. patent application Ser. No. 14/579,752, filed Dec. 22, 2014, and U.S. Pat. No. 8,788,405 B1, issued Jul. 22, 2014. The entire disclosures of those applications are hereby made part of this specification as if set forth fully herein and incorporated by reference for all purposes, for all that they contain.

BACKGROUND

Embodiments of the present disclosure generally relate to identifying phishing, spam, and malicious electronic communications.

Phishing communications are unsolicited electronic communications, from fraudulent senders masquerading as trustworthy entities, seeking sensitive information from recipients of the unsolicited electronic communications. Spam communications are unsolicited bulk communications akin to electronic junk mail. Malicious communications include unsolicited communications sent with the intention of disrupting the recipient's computer or network communications intended to install "malware" (hostile or intrusive software, in the form of executable code, scripts, active content, and other software, which includes computer viruses, worms, Trojan horses, ransomware, spyware, adware, scareware, and other malicious programs). It is important for local network administrators to identify such communications and take appropriate actions to protect the local network or the recipients' computers or sensitive information. In this disclosure, the term "undesirable electronic communications" or "undesirable communications" encompasses, among other things, phishing, spam, and other malicious electronic communications, including those discussed above and others described herein.

SUMMARY

A recipient of a potentially undesirable electronic communication can forward the electronic communication to an administrator. A computer-implemented data analysis system can group the potentially undesirable electronic communication with any other similar potentially undesirable electronic communications in a data cluster and classify the data cluster with a classification reflecting a priority for assessing the potentially undesirable electronic communication(s) in the data cluster. The system can also generate user interface data for rendering an interactive user interface allowing an analyst to view the context and scope of the data cluster and triage all potentially undesirable electronic communication(s) in the data cluster as a group. The systems, methods, and devices described herein each have several aspects, no single one of which is solely responsible for its desirable attributes. Without limiting the scope of this disclosure, several non-limiting features will now be discussed briefly.

Embodiments of the present disclosure relate to a data analysis system that may automatically generate memory-efficient clustered data structures, automatically analyze those clustered data structures, automatically tag and group those clustered data structures in tiers, and provide results of the automated analysis and grouping in an optimized way to an analyst. The automated analysis of the clustered data structures (also referred to herein as "data clusters" or simply "clusters") may include an automated application of various criteria or rules so as to generate a tiled display of the tiers of related data clusters such that the analyst may quickly and efficiently evaluate the tiers of data clusters. In particular, the tiers of data clusters may be dynamically re-grouped and/or filtered in an interactive user interface so as to enable an analyst to quickly navigate among information associated with various tiers and efficiently evaluate the tiers of data clusters.

As described below, tiers of data clusters may include one or more potentially undesirable electronic communications, such as emails, text messages, newsgroup postings, and the like. In an example application, a human analyst may be tasked with deciding whether potentially undesirable electronic communication represents a phishing, spam, or malicious communication. In a very large local network, such as in a company employing hundreds of thousands of employees, such decisions may require a large team of analysts evaluating massive numbers of individual electronic communications. Certain embodiments include the inventive realization that grouping related potentially undesirable electronic communications in a data cluster can reduce the labor required for such decision making by allowing for triage of all potentially undesirable electronic communication(s) in the data cluster as a group.

Moreover, an individual potentially undesirable electronic communication often includes insufficient information for the analyst to effectively make such decisions. For example, the analyst could initiate an investigation with a single potentially undesirable electronic communications, such as a potentially malicious email. If the analyst examined this email by itself, then the analyst may not observe any suspicious characteristics. Certain embodiments include the inventive realization that an analyst may make better decisions based on a collection of related potentially undesirable electronic communications. For instance, two malicious emails may be related by an identical sender or similar subject fields. By viewing the emails in the context of a data cluster, the analyst could discover additional potentially undesirable electronic communications relating to the original email because of a shared characteristic. The analyst could then mark all the potentially undesirable electronic communications in the data cluster as malicious, based on the shared characteristic.

As described herein, various embodiments of the data analysis system of the present disclosure automatically create clusters of related potentially undesirable electronic communications, tags and groups the clusters in tiers, and generates an interactive user interface in which, in response to inputs from the analyst, information related to the tiers of clusters may be efficiently provided to the analyst. Accordingly, the analyst may be enabled to efficiently evaluate the tiers of clusters.

Generation of the memory-efficient clustered data structures may be accomplished by selection of one or more initial potentially undesirable electronic communication of interest (also referred to herein as "seeds"), adding of the initial potentially undesirable electronic communication to the memory-efficient clustered data structure (or, alternatively, designating the initial potentially undesirable electronic communication as the clustered data structure, or an initial iteration of the clustered data structure), and determining and adding one or more related potentially undesirable electronic communications to the cluster. The number of potentially undesirable electronic communications in the cluster may be several orders of magnitude smaller than in the entire electronic collection of data described above because only potentially undesirable electronic communication related to each other are included in the clusters.

Additionally, the automated analysis and scoring of clusters (as mentioned above) may enable highly efficient evaluation of the various data clusters by a human analyst. For example, the interactive user interface is generated so as to enable an analyst to quickly view critical groups of data clusters (as determined by automated grouping in tiers), and then in response to analyst inputs, view and interact with the generated information associated with the clusters. In response to user inputs the user interface may be updated to display data associated with each of the generated groups of clusters if the analyst desires to dive deeper into data associated with a given group of clusters.

In various embodiments, seeds may be automatically selected/generated according to various seed determination strategies, and clusters of related potentially undesirable electronic communications may be generated based on those seeds and according to cluster generation strategies (also referred to herein as "cluster strategies"). Also, as mentioned above, the system may rank or prioritize the generated clusters. High priority clusters may be of greater interest to an analyst as they may contain related potentially undesirable electronic communications that meet particular criteria related to the analyst's investigation. In an embodiment, the system may enable an analyst to advantageously start an investigation with a prioritized cluster, or group of clusters, including many related potentially undesirable electronic communications rather than a single randomly selected potentially undesirable electronic communications. Further, as described above, the cluster prioritization may enable the processing requirements of the analyst's investigation to be highly efficient as compared to processing of the huge collection of data described above. As mentioned above, this is because, for example, a given investigation by an analyst may only require storage in memory of a limited number of potentially undesirable electronic communications associated with a small number of clusters, and further, a number of potentially undesirable electronic communications in a cluster may be several orders of magnitude smaller than in the entire electronic collection of data described above because only potentially undesirable electronic communications related to each other are included in the cluster. Further, an analyst may not need to view many (or, alternatively, any) potentially undesirable electronic communications associated with a cluster to evaluate the cluster, but rather may evaluate the cluster based on the automatically generated cluster information.

In various embodiments, grouping of related data clusters enables an analyst to review the data in a logical way. For example, the data clusters may be tagged and grouped according to a recipient's position in the local network. Further, when a group of related data clusters is determined by the analyst to not be important, the analyst may quickly dismiss all potentially undesirable electronic communications of that group of clusters, rather than each potentially undesirable electronic communication separately. This advantageously enables computationally-efficient processing, allowing analysts to process entire clusters with one click rather than email by email.

According to an embodiment, a computer system is disclosed, the system comprising one, some, or all of the following features, as well as features described elsewhere in this disclosure. The system can comprise one or more computer readable storage devices configured to store one or more software modules including computer executable instructions, records of first electronic communications to internal recipients within a local network for a period of time, the records reflecting, for each of the first electronic communications, a plurality of characteristics, and/or a plurality of prescreened electronic communications, at least some of the prescreened electronic communications in the first electronic communications, each prescreened electronic communication preliminarily identified as a potential undesirable electronic communication, and each prescreened electronic communication comprising the plurality of characteristics.

The system can also comprise one or more hardware computer processors in communication with the one or more computer readable storage devices and configured to execute the one or more software modules in order to cause the computer system to: access, from the one or more computer readable storage devices, the plurality of prescreened electronic communications and the records; group, from the plurality of prescreened electronic communications, a data cluster of the prescreened electronic communications sharing a similar characteristic from the plurality of characteristics; based on a first characteristic associated with the data cluster and the same first characteristics of the records, identify recipients associated with the data cluster from the first electronic communications; based on one or more attributes of the data cluster, classify the data cluster with a classification reflecting a priority for assessing whether the prescreened electronic communications associated with the data cluster are undesirable electronic communications, such that, once initiated, the classifying is performed by the one or more hardware computer processors, without the need for manually performing the classifying; generate user interface data for rendering an interactive user interface on a computing device, the interactive user interface including an element selectable by a user, the selectable element reflecting the classification; and/or update the user interface data such that, after the selectable element is selected by the user, the interactive user interface further includes informational data regarding the data cluster, the informational data reflecting the recipients associated with the data cluster.

According to an aspect, the plurality of characteristics can comprise a from field corresponding to a purported author of the respective first electronic communication, one or more recipient fields corresponding to the recipients of the respective first electronic communication, and a subject field corresponding to a purported topic of the respective first electronic communication.

According to another aspect, the one or more attributes can comprise the number of prescreened electronic communications in the data cluster. The one or more attributes can comprise an identity of one or more recipients of the prescreened electronic communications in the data cluster. Each prescreened electronic communication can further comprise a message body, and the one or more hardware computer processors in communication with the one or more computer readable storage devices can be configured to execute the one or more software modules in order to cause the computer system to parse the message body for any uniform resource locators. The one or more attributes can comprise a determination that the message body includes at least one uniform resource locator.

According to yet another aspect, the computer system can further comprise a network connection configured to access, from one or more remote networks not within the local network, one or more domain name system blackhole lists or real-time blackhole lists, the one or more attributes comprising a determination that the message body includes at least one uniform resource locator, or a portion thereof, on the domain name system blackhole list(s) or real-time blackhole list(s). The one or more computer readable storage devices can be further configured to store a log of requests from the local network seeking resources outside the local network, and the one or more hardware computer processors in communication with the one or more computer readable storage devices can be configured to execute the one or more software modules in order to cause the computer system to identify instances in the log indicating a request from the local network seeking a parsed uniform resource locator. The informational data can further reflect an identification of the instances in the log.

According to another aspect, the one or more hardware computer processors in communication with the one or more computer readable storage devices can be configured to execute the one or more software modules in order to further cause the computer system to receive a disposition from the user that the prescreened electronic communications associated with the data cluster are undesirable electronic communications. The one or more hardware computer processors in communication with the one or more computer readable storage devices can be configured to execute the one or more software modules in order to further cause the computer system to, based on the disposition, transmit an electronic notification to the recipients associated with the data cluster.

According to an embodiment, a computer-implemented method is disclosed, the method comprising one, some, or all of the following features, as well as features described elsewhere in this disclosure. The method can comprise, as implemented by one or more computer readable storage devices configured to store one or more software modules including computer executable instructions, and by one or more hardware computer processors in communication with the one or more computer readable storage devices configured to execute the one or more software modules, accessing, from the one or more computer readable storage devices, a plurality of electronic communications, each comprising a message body, a from field corresponding to a purported author of the respective prescreened electronic communication, and a subject field corresponding to a purported topic of the respective prescreened electronic communication, grouping, from the plurality of electronic communications, a data cluster of the electronic communications sharing a similar from field or a similar subject field, and/or accessing, from one or more remote networks, one or more domain name system blackhole lists or real-time blackhole lists.

The method can further comprise, for one or more of the electronic communications in the data cluster, parsing the respective message body for uniform resource locators, based at least in part on a determination that the message body includes at least one uniform resource locator, or a portion thereof, on the domain name system blackhole list(s) or real-time blackhole list(s), classifying the data cluster with a classification reflecting a priority for assessing whether the electronic communications associated with the data cluster are undesirable electronic communications, such that, once initiated, the classifying is performed by the one or more hardware computer processors, without the need for manually performing the classifying, generating user interface data for rendering an interactive user interface on a computing device, the interactive user interface including an element selectable by a user, the selectable element reflecting the classification, and/or updating the user interface data such that, after the selectable element is selected by the user, the interactive user interface further includes informational data regarding the data cluster.

According to an aspect, each electronic communication can further comprise the one or more recipient fields. The computer-implemented method can further comprise accessing records of first electronic communications to internal recipients within a local network for a period of time, the records reflecting, for each of the first electronic communications, a from field corresponding to a purported author of the respective first electronic communication, one or more recipient fields corresponding to the recipients of the respective first electronic communication, and a subject field corresponding to a purported topic of the respective first electronic communication.

According to another aspect, the computer-implemented method can further comprise, based on the from field or the subject field associated with the data cluster and the from fields or the subject fields of the records, identifying additional recipients associated with the data cluster from the first electronic communications. The classifying can be further based, at least in part, on an identity of one or more the recipients of the electronic communications in the data cluster.

According to yet another aspect, the method can further comprise accessing a log of requests from the local network seeking resources outside the local network; and identifying instances in the log indicating a request from the local network seeking a parsed uniform resource locator. The informational data can comprise an identification of the instances in the log.

According to another aspect, the method can further comprise receiving a disposition from the user that the electronic communications associated with the data cluster are undesirable electronic communications. The method can further comprise, based on the disposition, transmitting an electronic notification to recipients associated with the data cluster and the additional recipients.

In various embodiments, computer-implemented methods are disclosed in which, under control of one or more hardware computing devices configured with specific computer executable instructions, one or more aspects of the above-described embodiments are implemented and/or performed.

In various embodiments, a non-transitory computer-readable storage medium storing software instructions is disclosed that, in response to execution by a computer system having one or more hardware processors, configure the computer system to perform operations comprising one or more aspects of the above-described embodiments.

Further, as described herein, a data analysis system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for an analyst user.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components (for example, retrieval of clusters), automatic and dynamic execution of complex processes in response to the input delivery (for example, grouping and filtering of clusters), automatic interaction among various components and processes of the system, and/or automatic and dynamic updating of the user interfaces. The interactions and presentation of data via the interactive user interfaces described herein may accordingly provide cognitive and ergonomic efficiencies and advantages over previous systems.

Advantageously, according to various embodiments, the disclosed techniques provide a more effective starting point and user interface for an investigation of potentially undesirable electronic communications of various types. An analyst may be able to start an investigation from a group of clusters of related potentially undesirable electronic communications instead of an individual potentially undesirable electronic communication, which may reduce the amount of time and effort required to perform the investigation. The disclosed techniques may also, according to various embodiments, provide a prioritization of multiple clusters, and dynamic re-grouping of related clusters and cluster filtering. For example, the analyst may also be able to start the investigation from a high priority group of clusters, which may allow the analyst to focus on the most important investigations, and may quickly evaluate that group of clusters based on the efficient user interface generated by the system. In each case, the processing and computational requirements of such an investigation may be significantly reduced due to the creation and use of highly efficient cluster data structures of related potentially undesirable electronic communications.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 9-13 are dossier analysis user interfaces showing informational data regarding a data cluster, as used in an embodiment.

FIGS. 14A and 14B are dossier analysis user interfaces showing informational data regarding a data cluster, as used in an embodiment.

Figure 1:
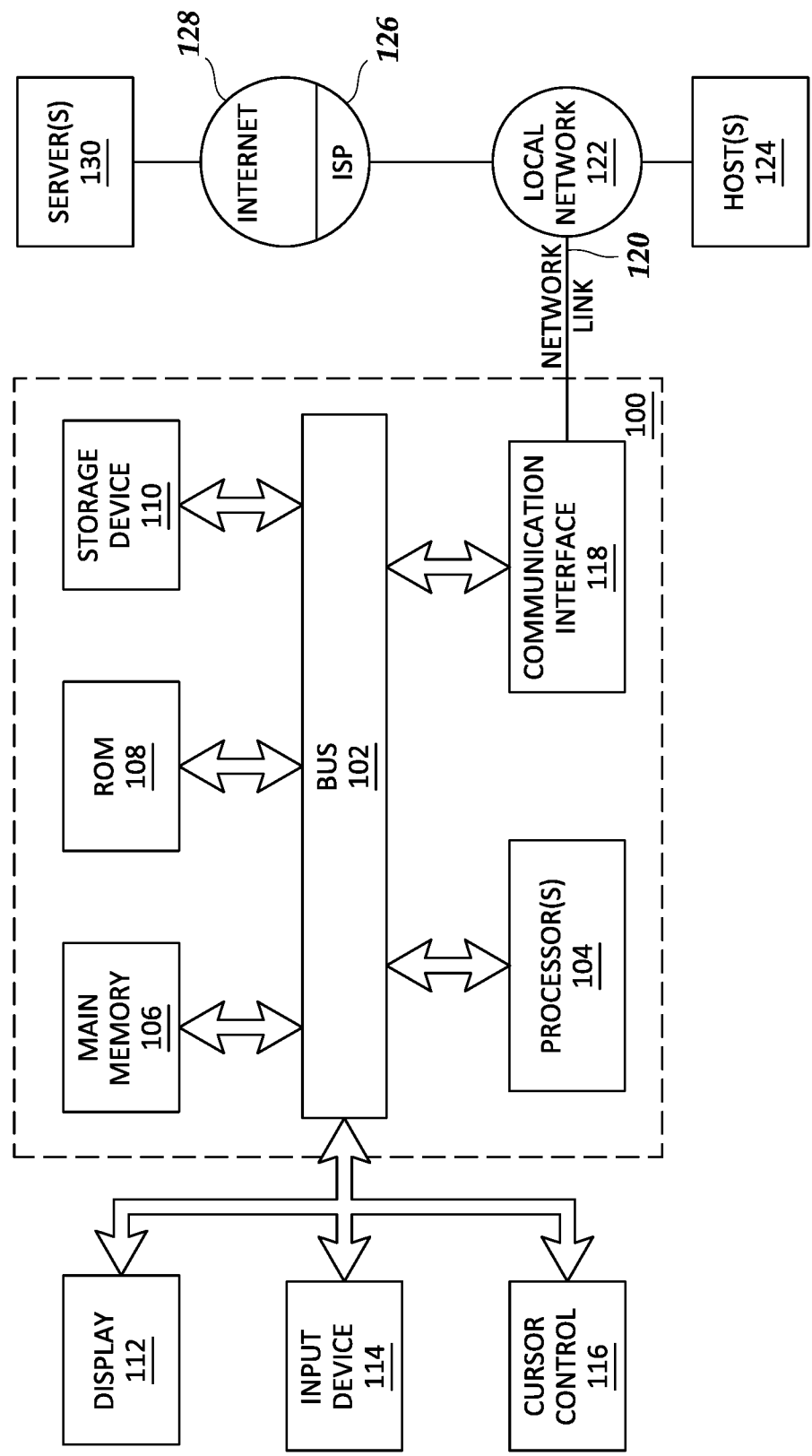
FIG. 1 is a block diagram of a server system, as used in an embodiment.

In the drawings, the first one or two digits of each reference number typically indicate the figure in which the element first appears. Throughout the drawings, reference numbers may be reused to indicate correspondence between referenced elements. Nevertheless, use of different numbers does not necessarily indicate a lack of correspondence between elements. And, conversely, reuse of a number does not necessarily indicate that the elements are the same.

DETAILED DESCRIPTION

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

TERMS

In order to facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Database: A broad term for any data structure for storing and/or organizing data, including, but not limited to, relational databases (for example, Oracle database, mySQL database, and the like), spreadsheets, XML files, and text files, among others. The various terms "database," "data store," and "data source" may be used interchangeably in the present disclosure.

Potentially undesirable electronic communication: An electronic communication that has been preliminarily screened and identified as a possible undesirable electronic communication but that has not been triaged by a designated analyst and conclusively identified as an undesirable electronic communication. A potentially undesirable electronic communication may represent a document or other unstructured data source such as an e-mail message, a news report, or a written paper or article. Each potentially undesirable electronic communication may be associated with a unique identifier that uniquely identifies it. The preliminary screening can be done by a human recipient. The preliminary screening can be done automatically, without human intervention, by electronic rules or a program.

Cluster: A group or set of one or more related potentially undesirable electronic communications. A cluster may be generated, determined, and/or selected from one or more sets of potentially undesirable electronic communication according to a cluster generation strategy. A cluster may further be generated, determined, and/or selected based on a seed. For example, a seed may comprise an initial potentially undesirable electronic communication of a cluster. Potentially undesirable electronic communications related to the seed may be determined and added to the cluster. Further, additional potentially undesirable electronic communications related to any clustered potentially undesirable electronic communication may also be added to the cluster iteratively as indicated by a cluster generation strategy. Potentially undesirable electronic communications may be related by any common and/or similar properties, metadata, types, relationships, and/or the like. Clusters may also be referred to herein as "data clusters."

Seed: One or more potentially undesirable electronic communications that may be used as a basis, or starting point, for generating a cluster. A seed may be generated, determined, and/or selected from one or more sets of potentially undesirable electronic communications according to a seed generation strategy. For example, seeds may be generated from potentially undesirable electronic communications accessed from various databases and data sources.

Dossier: A collection of information associated with a cluster or a group of clusters and/or a user interface for displaying such a collection.

Overview

When investigating phishing, spam, or malicious communications, an analyst may have to make decisions regarding a large number of electronic communications that may or may not be related to one another, and which may be stored in an electronic data store or memory. For example, such a collection of data may include hundreds of thousands or millions of potentially undesirable electronic communications, and may consume significant storage and/or memory. Determination and selection of relevant communications within such a collection may be extremely difficult for the analyst. Further, processing of such a large collection of data (for example, as an analyst uses a computer to sift and/or search through large pluralties of potentially undesirable electronic communications) may be extremely inefficient and consume significant processing and/or memory resources.

This disclosure relates to a system for analyzing potentially undesirable electronic communications (also referred to herein as the "system") in which computationally-efficient clustered data structures (also referred to herein as "clusters") of related electronic communications may be automatically generated and analyzed, tagged, grouped, and results may be provided for interaction from an analyst, for example. Generation of clusters may begin by automatic generation, determination, and/or selection of one or more initial communications of interest, called "seeds." Clusters of related electronic communications may be generated based on those seeds and according to cluster generation strategies (also referred to herein as "cluster strategies," "clustering strategies," and/or "cluster generation rules"). Seeds and related electronic communications may be accessed from various databases and data sources including, for example, databases maintained by financial institutions, government entities, private entities, public entities, and/or publicly available data sources. Such databases and data sources may include a variety of information and data, such as, for example, computer network-related data, and/or computer-related activity data, among others. Further, the databases and data sources may include various relationships that link and/or associate electronic communications with one another. Various electronic communications and relationships may be stored across different systems controlled by different items and/or institutions. According to various embodiments, the system may bring together data from multiple data sources in order to build clusters.

In the following description, numerous specific details are set forth to provide a more thorough understanding of various embodiments of the present disclosure. It will be apparent to one of skill in the art, however, that the systems and methods of the present disclosure may be practiced without one or more of these specific details.

DESCRIPTION OF THE FIGURES

Embodiments of the disclosure will now be described with reference to the accompanying Figures. The terminology used in the description is not intended to be interpreted in any limited or restrictive manner, simply because it is being utilized in conjunction with a detailed description of certain specific embodiments of the disclosure. Furthermore, embodiments of the disclosure described above and/or below may include several novel features, no single one of which is solely responsible for its desirable attributes or which is essential to practicing the embodiments of the disclosure herein described.

I. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

FIG. 1 is a block diagram that illustrates a computer system 100 upon which an embodiment may be implemented. For example, any of the computing devices discussed herein may include some or all of the components and/or functionality of the computer system 100.

Computer system 100 includes a bus 102 or other communication mechanism for communicating information, and a hardware processor, or multiple processors, 104 coupled with bus 102 for processing information. Hardware processor(s) 104 may be, for example, one or more general purpose microprocessors.

Computer system 100 also includes a main memory 106, such as a random access memory (RAM), cache and/or other dynamic storage devices, coupled to bus 102 for storing information and instructions to be executed by processor 104. Main memory 106 also may be used for storing temporary variables or other intermediate information during execution of instructions to be executed by processor 104. Such instructions, when stored in storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, optical disk, or USB thumb drive (Flash drive), etc., is provided and coupled to bus 102 for storing information and instructions.

Computer system 100 may be coupled via bus 102 to a display 112, such as a cathode ray tube (CRT) or LCD display (or touch screen), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 100 may implement the techniques described herein using customized hard-wired logic, one or more ASICs or FPGAs, firmware and/or program logic which in combination with the computer system causes or programs computer system 100 to be a special-purpose machine. According to one embodiment, the techniques herein are performed by computer system 100 in response to processor(s) 104 executing one or more sequences of one or more instructions contained in main memory 106. Such instructions may be read into main memory 106 from another storage medium, such as storage device 110. Execution of the sequences of instructions contained in main memory 106 causes processor(s) 104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 110. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may retrieve and execute the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of telephone line. As another example, communication interface 118 may be a local area network (LAN) card to provide a data communication connection to a compatible LAN (or WAN component to communicated with a WAN). Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution.

Figure 2:
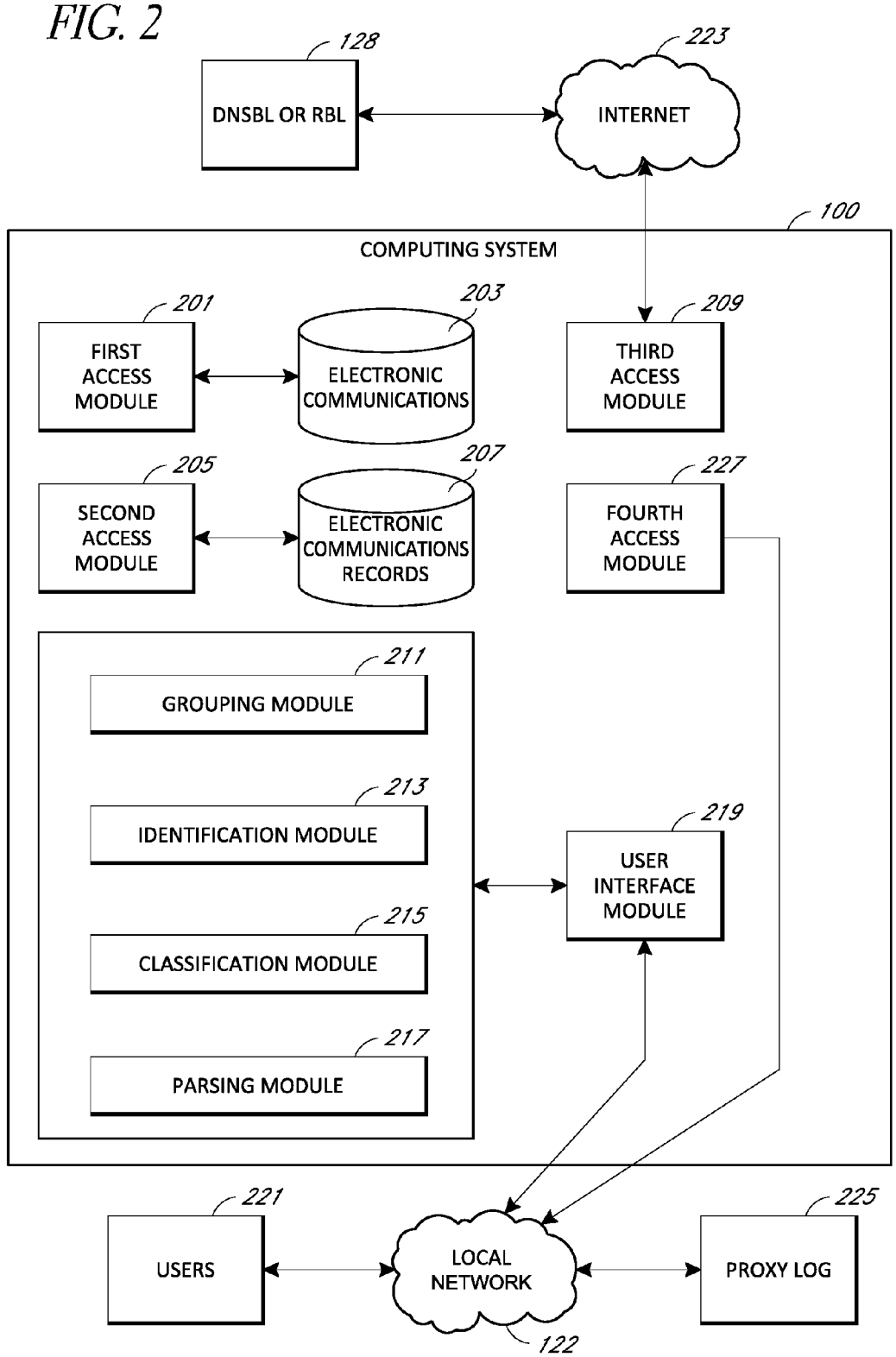
FIG. 2 is a block diagram of a computing system for analyzing potentially undesirable electronic communications, as used in an embodiment.

FIG. 2 is a block diagram of the computer system 100 for analyzing potentially undesirable electronic communications, as used in an embodiment. In variations, additional blocks may be included, some blocks may be removed, and/or blocks may be connected or arranged differently from what is shown.

Computer system 100 interfaces with local network 122, described above with reference to FIG. 1. Users 221 interact with the local network 122, for example, for email, text messaging, newsgroups, etc. In certain embodiments, users 221 can receive electronic communications via the local network 122. A recipient (one of the users 221) of an electronic communication can make a preliminary determination that the communication is a potential phishing, spam, or malicious communication and forward the communication to an administrator. For example, a company employee can forward a potential phishing, spam, or malicious email to a corporate "abuse" email account (e.g., abuse@example.org).

Computer system 100 may include computer readable storage devices. For example, computer system 100 may include electronic communications records storage device 207. The electronic communications records storage device 207 may be configured to store records of first electronic communications to internal recipients within a local network for a period of time. As an example, the electronic communications records storage device 207 can store records of emails sent to recipients within the local network 122 over the last week or the last month or the last six months. An example can be a PROOFPOINT (Proofpoint, Inc., Sunnyvale, Calif.) log. For each of the first electronic communications, a record can reflect the "from" field corresponding to a purported author of the first electronic communication, one or more "recipient" fields corresponding to the recipients of the respective first electronic communication (e.g., a "to" field, a "cc" field, and/or a "bcc" field), and/or the subject field corresponding to a purported topic of the respected first electronic communication. An electronic communications record need not be an email itself. This term is a broad term and encompasses subsets of data about electronic communications. For example, the term encompasses certain metadata regarding emails.

Computer system 100 may further include electronic communications storage device 203. The electronic communications storage device 203 may be configured to store a plurality of prescreened electronic communications. As an example, the electronic communications storage device 203 can store prescreened emails. In at least one embodiment, each prescreened electronic communication is preliminarily identified as a potential undesirable electronic communication.

As used herein, the term prescreened electronic communication refers to an electronic communication that has been reviewed and identified as potentially having a certain characteristic or characteristics. The review need not be detailed or performed by someone with special training. For example, the initial recipient of the electronic communication can perform the prescreening. In this regard, a prescreened electronic communication can refer to an email that has been reviewed by its human recipient and judged or identified as a potentially undesirable electronic communication. In other instances, as noted above, the prescreening can occur without human intervention, for example, with applied rules or a suitable program. A company employee can forward a potential phishing, spam, or malicious email to an abuse account. Fourth access module 227 and/or another suitable module interfacing with the local network 122 can execute a suitable script to download the emails in the abuse email account to a computer folder or subfolder or other database as text-formatted file, such as an .eml file. The computer folder, subfolder, or other database can represent an example of electronic communications storage device 203, discussed above. Each prescreened electronic communication in the electronic communications storage device 203 can include a from field, one or more recipient fields, a subject field, and/or a message body.

Computer system 100 may include one or more modules which may be implemented as software or hardware. For example, computer system 100 may include first access module 201. The first access module 201 may be configured to access, from the electronic communications storage device 203, the plurality of prescreened electronic communications. Computer system 100 may include second access module 205. The second access module 205 may be configured to access, from the electronic communications records storage device 207, the records.

Computer system 100 may include grouping module 211. Grouping module 211 of computer system 100 may be configured to group, from the plurality of prescreened electronic communication, a data cluster of the prescreened electronic communications. A data cluster may be generated, determined, and/or selected from one or more sets of electronic communications according to a cluster generation strategy. A data cluster may further be generated, determined, and/or selected based on a seed. For example, seeds may comprise emails received within a time or date range, such as the last 24 hours. Electronic communications related to the seeds may be determined and added to the cluster. Further, additional electronic communications related to any clustered electronic communication may also be added to the cluster iteratively as indicated by a cluster generation strategy. Electronic communications may be related by any common and/or similar properties, metadata, types, relationships, and/or the like. Data clusters may also be referred to herein as "clustered data structures," "electronic communication clusters," and "clusters." Data clusters are described in further detail in U.S. patent application Ser. No. 14/579,752 and U.S. Pat. No. 8,788,405, which have been incorporated herein by reference in their entireties.

In at least one embodiment, the prescreened electronic communications of a data cluster share a similar from field and/or a similar subject field. For example, the grouping module 211 can identify an initial electronic communication and its from field and/or its subject field. The grouping module 211 may identify additional electronic communications with similar from fields and/or similar subject fields and add them to the cluster. In at least one embodiment, the grouping module 211 identifies electronic communications having the same from field. Alternatively, or in conjunction, the grouping module 211 can identify electronic communications having from fields with similar characteristics. For instance, the grouping module 211 can implement regular expression matching or another suitable pattern recognition algorithm to identify email addresses having the same local part (the part before the "@" symbol), even if the email addresses have different domain parts (the part after the "@" symbol). Or the grouping module 211 can identify email addresses having similar patterns, such as abc1def@example.com, bcd2efg@example.com, and cde3fgh@example.com. As yet another example, grouping module 211 can identify electronic communications having the same subject field. Alternatively, or in conjunction the grouping module 211 can identify electronic communications having subject fields with similar characteristics. For instance the grouping module 211 can identify email subjects following a pattern, such as "<Varying Bank Name>: Online Banking Security Precaution," using a suitable technique such as regular expression matching.

Other suitable techniques for identifying additional electronic communications with similar from fields and/or similar subject fields and adding them to the cluster with the grouping module 211 are also contemplated. Yet another example of such grouping can include grouping based on similar edit distances. Edit distance is a technique of quantifying how dissimilar two strings (such as words) are to one another by counting the minimum number of operations required to transform one string into the other.

Optionally, computer system 100 may further include an identification module 213. The identification module 213 of computer system 100 may identify additional recipients associated with the data cluster. As noted above, a data cluster comprises prescreened electronic communications. The additional recipients need not be associated with prescreened electronic communications. For example, many recipients within a local network may receive similar emails and some of those recipients may report the emails as potential phishing communications to an administrator. Some recipients may not report the emails to anyone, however.

In this regard, the additional recipients can be identified in the records accessed by second access module 205 or in another electronic communications storage device (not shown). For example, identification module 213 can identify the subject field of the prescreened electronic communications or a substring within the subject field of the prescreened electronic communications, such as the first, middle, or last n characters. Then, the identification module 213 can access electronic communications records storage device 207 (optionally via second access module 205) and identify additional electronic communications having the same subject field or substring. Based on the subject fields of the identified additional electronic communications, the identification module 213 can determine additional recipients of those additional electronic communications corresponding with the associated to, cc, or bcc fields.

Computer system 100 may include an optional classification module 215. Classification module 215 of computer system 100 may be configured to classify, based on one or more attributes of the data cluster, the data cluster with a classification reflecting a priority for assessing whether the prescreened electronic communications associated with the data cluster are undesirable electronic communications. Advantageously, the classification module 215 is configured such that, once initiated, the classifying is performed by the one or more hardware computer processors, without the need for manually performing the classifying.

For instance, in one embodiment, classification module 215 can automatically determine a rank or status of a recipient of a prescreened electronic communication in a data cluster without requiring user intervention. As an example, classification module can identify an employee identification number associated with a recipient, cross reference the employee identification number against an organizational database for the local network, and determine the recipient's rank. The relevant information, such as the employee identification number and rank, can be stored to the data cluster dossier. A data cluster including a recipient with a sufficiently high rank or status, such as a C suite officer or critical employee, may be assigned classification reflecting a high priority for assessing whether the prescreened electronic communications associated with the data cluster are undesirable electronic communications.

Computer system 100 may also include a parsing module 217. As discussed above, each prescreened electronic communication can comprise a message body in some embodiments. Parsing module 217 of computer system 217 may be configured to parse, for one or more of the electronic communications in the data cluster, the respective message body for certain strings, such as uniform resource locators.

Computer system 100 may include a user interface module 219. The user interface module 219 can be configured to generate user interface data for rendering an interactive user interface on a computing device. The user interface module 219 can also be configured to update the user interface data. User interface module 219 may include one or more modules configured to generate user interfaces, such as web pages, desktop applications, mobile interfaces, voice interfaces, and the like. The user interface module 219 may invoke the above described modules in order to make calculations to be presented to individuals. The user interface module 219 may present data via network. The user interface module 219 may further receive input from individuals so that the input may be provided to the appropriate modules and/or stored.

Computer system can optionally interact with a proxy log 225 via the local network 122. In general, the proxy log 225 is produced by a local network proxy server and gives detailed information about the URLs accessed by specific users 221. In various embodiment discussed herein, fourth access module 227 and/or another suitable module interfacing with the local network 122 can execute a suitable script to search the proxy log for a particular URL or IP address and determine which users 221 (if any) have accessed the URL.

Computer system 100 is also configured to interface with DNSBL or RBL 128 or other blacklist. DNSBL stands for a DNS-based Blackhole List, and RBL stands for Real-time Blackhole List. These are "blacklists" of locations on the Internet reputed to send email spam or other undesirable electronic communications. In computing, a blacklist is a basic access control mechanism for allowing through elements, except those explicitly mentioned in the list. Those items on the list are denied access. Third access module 209 can be used to interface with third party vendor's DNSBL or RBL 128 or other blacklist via Internet 223. For example, as described in greater detail below, third access module 209 can be instructed to check an IP address against DNSBL or RBL 128 or other blacklist, such as dnsbl.example.net. The third access module 209 can take the IP access (such as 192.168.42.23) and reverse the order of the octets (23.42.168.192). The third access module 209 can then append the domain name of DNSBL or RBL 128 or other blacklist, yielding 23.42.168.192.dnsbl.example.net. Subsequently, the third access module 209 can look up this name in the DNS as a domain name. The query will either return an address, indicating that the IP address is blacklisted or a no-such-domain code (such as NXDOMAIN), indicating that the IP address is not blacklisted. If the IP address is listed, the third access module 209 optionally can look up why the IP address is listed as a text record, a function supported by most blacklist services.

II. Implementation Methods

Figure 3:
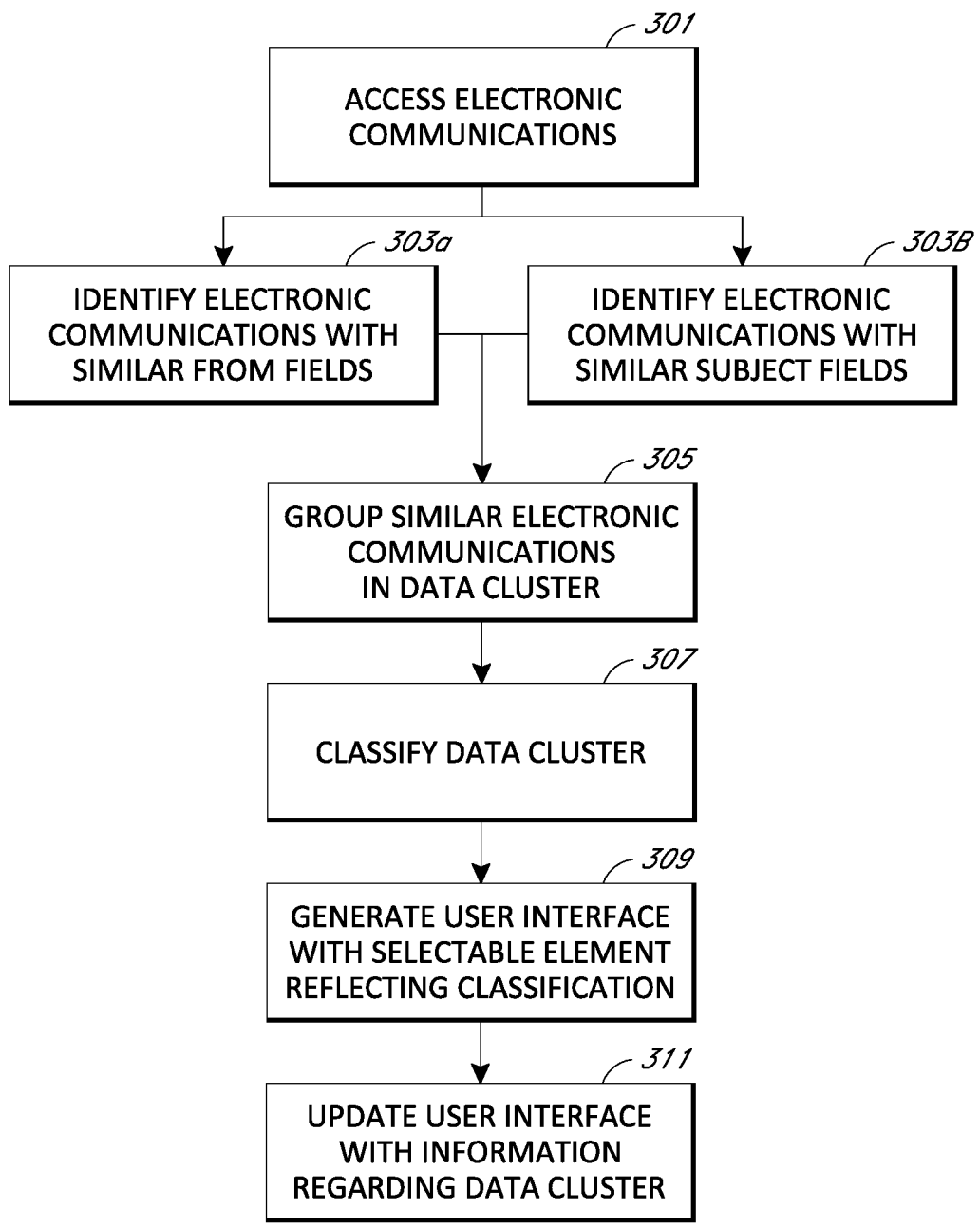
FIG. 3 is a process of analyzing potentially undesirable electronic communications, as used in an embodiment.

FIG. 3 shows an example method for implementing computer system 100 of FIG. 2, namely, a process of analyzing potentially undesirable electronic communications. In box 301, computer system 100 accesses electronic communications. Box 301 of FIG. 3 can be implemented with first access module 201 and second access module 205 of FIG. 2. In an example embodiment, a script is executed to generate the initial seeds for generating collections of clusters of related data from the seeds, as described in U.S. Pat. No. 8,788,405, incorporated herein by reference. The seeds can be, for instance, a time or date range of emails to target. The script can update the seeds each run to have the time or date range be, for example, the last 24-hour window.

In box 303a, computer system 100 identifies electronic communications with similar from fields. In box 303b, computer system 100 identifies electronic communications with similar subject fields. As discussed with reference to FIG. 2, box 303a in box 303b can be implemented with identification module 213. It should be clear that computer system 100 does not necessarily have to implement both box 303a and box 303b in the method. They can be implemented in the alternative. In box 305, computer system 100 groups similar electronic communications in a data cluster. Box 305 can be implemented with grouping module 211. For example, a cluster strategy, as described in U.S. Pat. No. 8,788,405, can be executed. The cluster strategy can process new emails, that is, emails received within the last 24 hours. The cluster strategy loads any data cluster object that has been modified in the last day. In other embodiments, the cluster strategy can load any data cluster object previously marked as malicious, which may encompass emails received greater than 24 hours in the past. For each new email, the strategy checks whether that email is already part of a data cluster. The strategy can merge the email with an existing data cluster based on subject. Emails that are not part of a data cluster generate new data clusters that eventually can be linked to other emails with similar subjects, senders, etc. Linking emails can be based off an identification property number for the data cluster. A data cluster can include information such as the submitter(s), recipients, external senders, subjects, and any URLs for the associated potentially undesirable electronic communications, as well as the body of the relevant email(s). A dossier can be created for each data cluster. The dossier comprises additional information besides the information from the potentially undesirable electronic communications that is relevant during analyst triage.

In box 307, computer system 100 classifies the data cluster. Box 307 can be implemented with classification module 215. An example classification is a priority tier, reflecting a priority for assessing whether the potentially undesirable electronic communications associated with the data cluster are actually undesirable electronic communications. The classification can be performed without the need for manual user intervention.

A factor in the classification algorithm can include the number of potentially undesirable electronic communications that are in the data cluster. Certain embodiments include the inventive realization that multiple similar potentially undesirable electronic communications submitted to an abuse account are more likely to be undesirable electronic communications than single instance electronic communications submitted to the abuse account.

Another factor in the classification algorithm can include whether the data cluster comprises any URLs on a DNSBL and/or RBL or other blacklist. Certain embodiments include the inventive realization that a data cluster including a URL on a DNSBL and/or RBL or other blacklist is more likely to be associated with undesirable electronic communications than a data cluster that does not include URLs or any identified URLs are not on a DNSBL and/or RBL or other blacklist.

Another factor in the classification algorithm can include whether the data cluster is associated a recipient with a sufficiently high rank or status, such as a C suite officer or critical employee. For example, it is important to identify phishing attacks targeting high ranking individuals in a local network, as compromised information can affect the local network's integrity. The identified tiers can be classified as desired. For example, tier 0 may be defined to relate to the highest priority data clusters (those most likely to be phishing or malicious communication) while tier 3 relates to the lowest priority data clusters (those most likely to be spam communications).

In box 309, computer system 100 generates a user interface with at least one selectable element reflecting the classification. And in box 311, computer system 100 updates the user interface with information regarding the data cluster. Box 309 and box 311 can be implemented with user interface module 219. For example, an analyst can review a dossier associated with a data cluster in a tier 0 classification and determine if the associated data cluster is malicious, phishing, spam, or a legitimate communication. The analyst assigns the dossier a status. The status is transferred to the data cluster. The analyst can mark entire clusters as legitimate or not.

Figure 4:
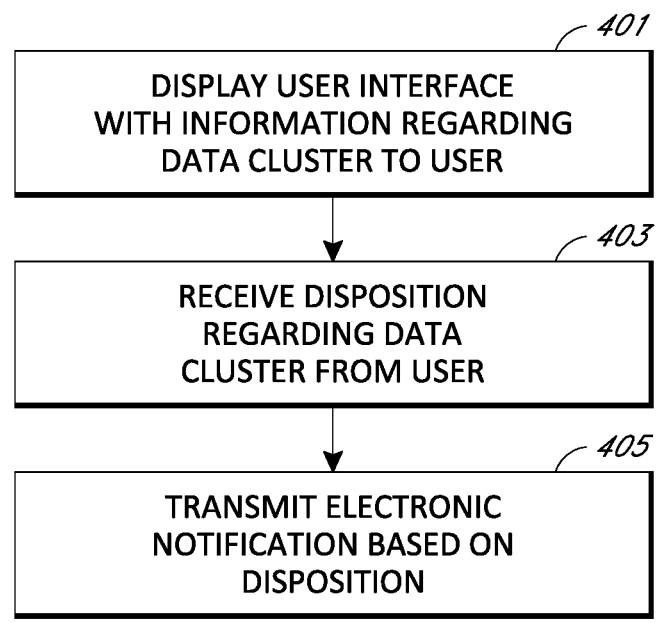
FIG. 4 is process of taking action based on potentially undesirable electronic communications, as used in an embodiment.

FIG. 4 shows another example method for implementing computer system 100 of FIG. 2, namely, a process of taking action based on potentially undesirable electronic communications. In box 401, computer system 100 displays a user interface with information regarding data cluster to user. In box 403, computer system 100 receives a disposition regarding the data cluster from a user. In box 405 computer system 100 transmits electronic notification based on the disposition. For example, a network administrator can execute a script to identify data clusters that were recently updated with a status. The script can identify all recipients associated in the dossier (including recipients who did not report the electronic communication to an abuse account) and send the recipients an email indicating the received electronic communication was a phishing, malicious, or other high-risk communication. In certain embodiments, when a new recipient reports an electronic communication as potentially undesirable and the cluster strategy merges the electronic communication with an existing data cluster already assigned a status, the script will send the new recipient a notification.

Figure 5:
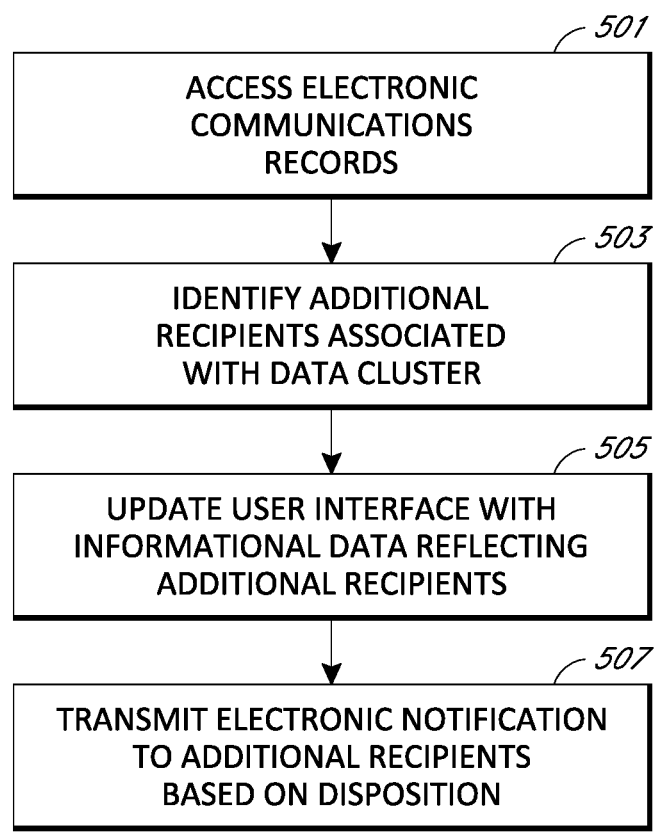
FIG. 5 is a process of analyzing potentially undesirable electronic communications and taking action based thereon, as used in an embodiment.

FIG. 5 shows another example method for implementing computer system 100 of FIG. 2, namely, a process of analyzing potentially undesirable electronic communications and taking action based thereon. In box 501, the computer system 100 accesses electronic communication records. In box 503, computer system 100 identifies additional recipients associated with the data cluster. For example, PROOFPOINT logs can be searched for emails with similar subjects. This search identifies additional recipients that received potentially undesirable electronic communications but did not report them to the abuse account discussed above. The additional recipients and/or relevant PROOFPOINT log entries can be added to the data cluster dossier. In box 505, computer system 100 updates the user interface with informational data reflecting the additional recipients. In box 507, computer system 100 transmits an electronic notification to additional recipients based on the disposition.

Figure 6:
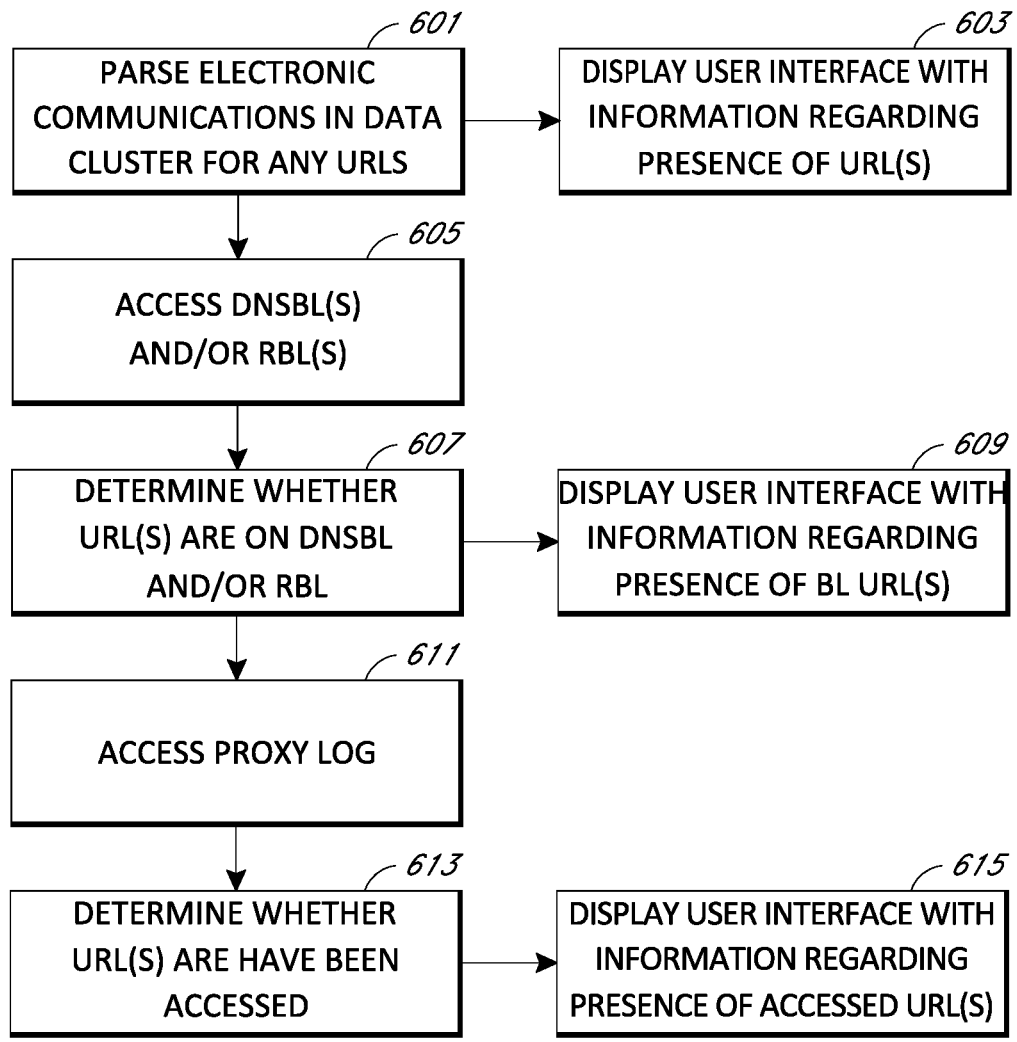
FIG. 6 is a process of analyzing potentially undesirable electronic communications, as used in an embodiment.

FIG. 6 shows yet another example method for implementing computer system 100 of FIG. 2, namely, a process of analyzing potentially undesirable electronic communications. In box 601, computer system 100 parses electronic communications in the data cluster for any URLs. In box 603, computer system 100 displays a user interface with information regarding the presence of any URLs. In box 611, computer system 100 accesses the proxy log. In box 613, computer system 100 determines whether the parsed URLs have been accessed by any users of the local network. In box 615 computer system 100 displays on the user interface information regarding the presence of any accessed URLs. For example, the local network proxy log can be searched for traffic to any URLs identified in the emails in the data cluster. This search identifies any members of the local network who visited a potentially malicious website by clicking on a URL in an email. These "clickers" can be added to the data cluster dossier.

In box 605, computer system 100 accesses one or more DNSBLs and/or RBLs or other blacklists. In box 607, computer system 100 determines whether the parsed URLs are on a DNSBL and/or RBL or other blacklist. In box 609, computer system 100 displays on the user interface information regarding the presence of blacklist URLs.

Figure 7:
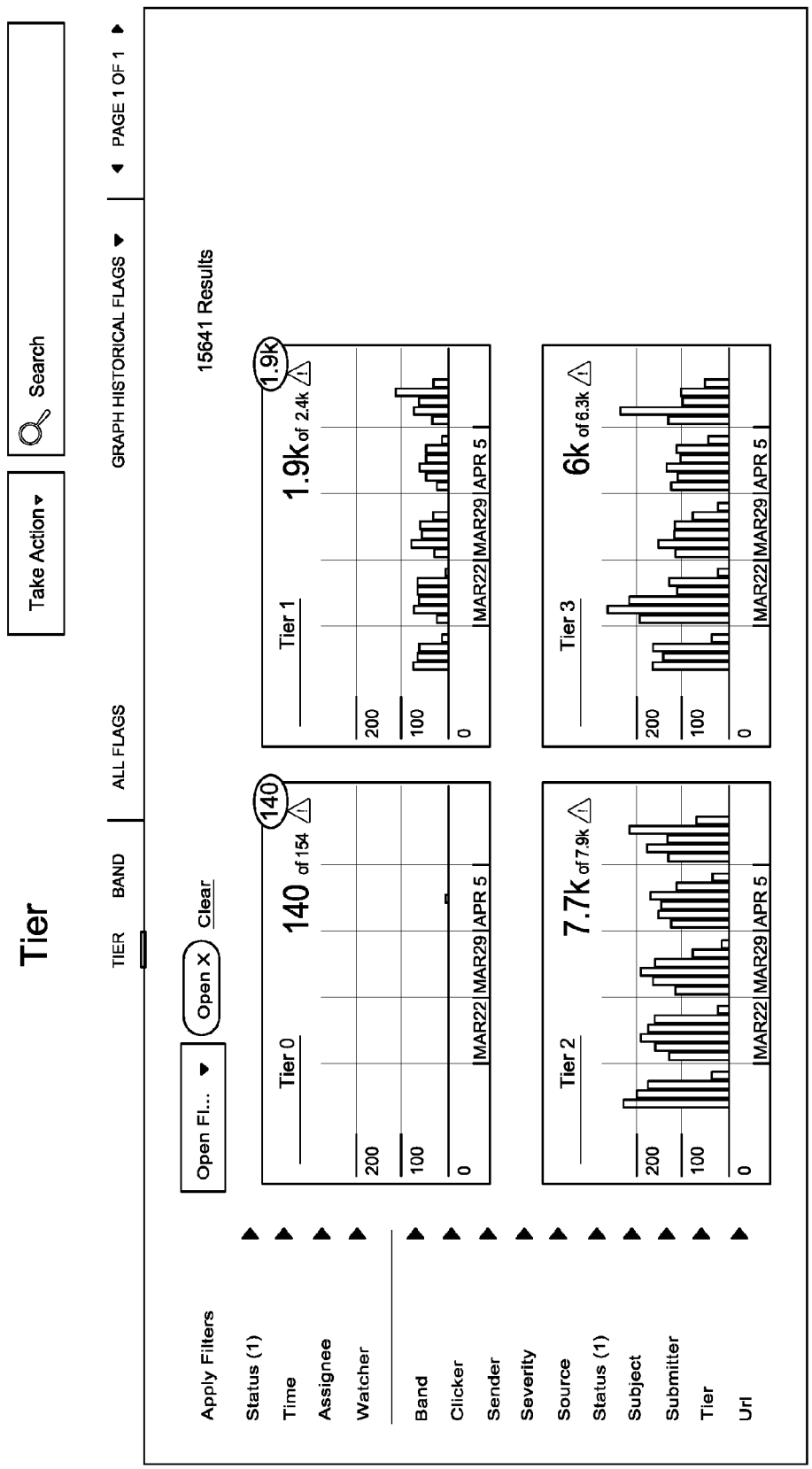
FIG. 7 is a data cluster analysis user interface in which multiple data clusters are prioritized, as used in an embodiment.

FIG. 7 shows a data cluster analysis user interface in which multiple data clusters are prioritized. The interactive user interface (generated with user interface module 219 of FIG. 2) can include an element selectable by a user. This example includes four selectable elements, labeled tier 0, tier 1, tier 2, and tier 3. Here, the selectable elements relate to classifications reflecting the priority for assessing whether the prescreened electronic communications associated with data clusters are undesirable electronic communications.

Figure 8:
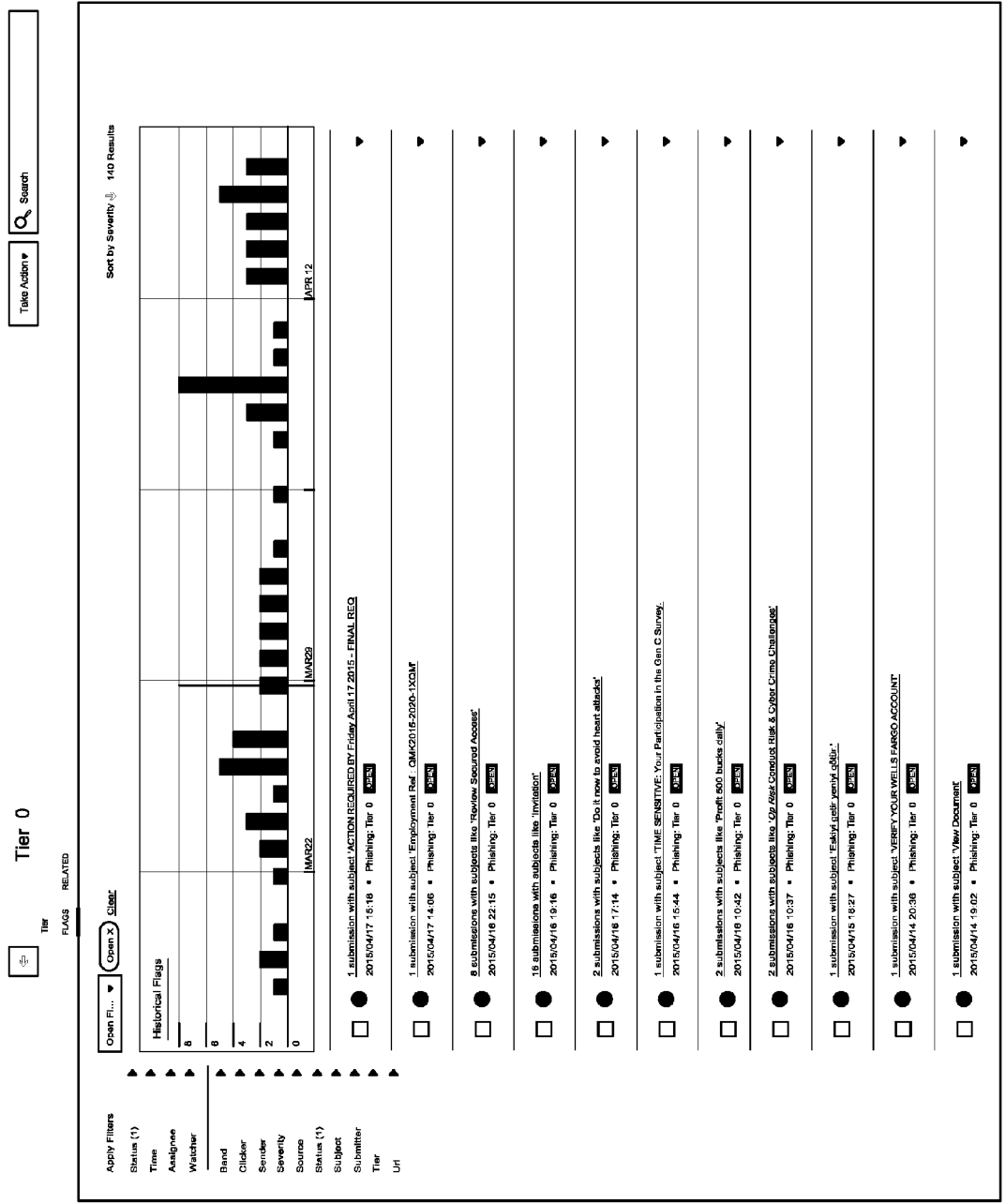
FIG. 8 is a data cluster analysis user interface showing potentially undesirable electronic communications for a high priority group of data clusters, as used in an embodiment.

A user selects a selectable element with a suitable input device such as a mouse, finger, or stylus. FIG. 8 shows a data cluster analysis user interface showing potentially undesirable electronic communications for a high priority group of data clusters. Turning next to FIG. 8, the user has selected tier 0. The interactive user interface shown in FIG. 8 has been updated to show a list of data clusters associated with that tier. For example, the first item in the list shows a data cluster comprising one prescreened electronic communication with the subject field "ACTION REQUIRED BY Friday Apr. 17, 2015—FINAL REQUEST." The second item in the list shows a data cluster comprising one prescreened electronic communication with the subject field "Employment Ref: QMK2015-2020-1XQM." The third item in the list shows a data cluster comprising eight prescreened electronic communications with subject fields like "Review Secured Access."

FIG. 8 also demonstrates certain aspects of the system's front-end filtering capabilities. The left-most column of FIG. 8 shows example metadata fields or filters that are filterable for each cluster. For example, a user can filter clusters based of a specific sender, rather than conducting tiled-tier filtering. A search bar in the upper-right corner of FIG. 8 allows for similar metadata search.

A user selects the third item in the list (the third data cluster) with a suitable input device. FIGS. 9-13 shows various aspects of a dossier analysis user interface showing informational data regarding a data cluster, here, the third data cluster. The interactive user interface shown in FIG. 9 has been updated to show informational data associated with the third data cluster. In this example, the interactive user interface displays a summary tab showing information such as who sent the prescreened electronic communications in the data cluster to the local network, who in the local network submitted it, which URLs were found in the prescreened electronic communications, which attachments were found in the prescreened electronic communications, and/or whether any of the URLs were found in a DNSBL and/or RBL or other blacklist. Here, the summary tab shows the prescreened electronic communications in the data cluster contain 61 total URLs and one attachment. Two of the URLs were found in a DNSBL and/or RBL or other blacklist, here the RISKIQ blacklist (RiskIQ, Inc., San Francisco, Calif.).

The user can select a messages tab with a suitable input device to have additional information data displayed on the user interface. The interactive user interface shown in FIG. 10 has been updated to show additional informational data associated with the third data cluster. In this example, the messages tab shows textual data, such as the message body, of prescreened electronic communications in the data cluster.

The user can select a clickers tab with a suitable input device to have additional information data displayed on the user interface. The interactive user interface shown in FIG. 11 has been updated to show additional informational data associated with the third data cluster. In this example, the clickers tab shows the result of searching the proxy log for the URLs associated with the data cluster to see who in the local network clicked on the links. The NAME field reflects the name of the user who accessed the URL. The NBID field reflects an identification number associated with the user. The BAND field reflects the user's rank or status within the local network, with a lower BAND number reflecting a higher ranking user. The NAME, NBID, and BAND can be stored in and retrieved from the data cluster dossier, as discussed.

The user can also select a recipients tab with a suitable input device to have additional information data displayed on the user interface. The interactive user interface shown in FIG. 12 has been updated to show additional informational data associated with the third data cluster. In this example, the recipients tab shows the result of searching electronic communications storage device 203 (such as a PROOFPOINT log) to identify recipients in the local network received electronic communications similar to the prescreened electronic communications, in addition to those recipients who reported the prescreened electronic communications to an administrator.

The user can also select a raw data option with a suitable input device to have additional information data displayed on the user interface. The interactive user interface shown in FIG. 13 has been updated to show additional informational data associated with the third data cluster. In this example, the raw data shows PROOFPOINT logs.

Turning next to FIGS. 14A and 14B, which show dossier analysis user interfaces showing informational data regarding a data cluster, once a data cluster is analyzed, an analyst gives the data cluster a status, such as "legitimate," "spam," "phishing," or "malicious." Depending on the status, recipients are notified, such as by email, informing the recipients not to enter their credentials or informing the recipients the prescreened electronic communications is legitimate and can be responded to. As noted above, in various embodiments, a recipient need not have reported a potentially undesirable electronic communication (e.g., to an abuse account) to receive the notification. It should also be understood that, in certain embodiments, a recipient can receive such a notification even if the potentially undesirable electronic communication received does not match all of the characteristics in the initial cluster in all respects. For example, a recipient may receive a notification if the recipient received an email from the same sender, with a slightly different subject but including the same phishing link, or variation on that phishing link and/or similar language.

All recipients associated with a data cluster can be identified (such as using PROOFPOINT logs) and stored in the data cluster dossier. The dossier can be cross-referenced for the notification. In yet another example, a seed email might lead to one hundred nearly identical emails being identified, but based on the characteristics of those emails, it may be discovered that there are other shared attributes among those that end up expanding the volume of potential spam that is captured. For example, email 1 is from sender A, with subject line B and link C. That link might show up in emails from a different sender D who does not use the same subject B. Nevertheless, the system would still recognize the emails are relevant because of the link. Then, the system can analyze emails with subject B and recognize that sender A is also using a third link and then cross reference and discover other senders using that different link.

III. Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments. In addition, the inventions illustratively disclosed herein suitably may be practiced in the absence of any element which is not specifically disclosed herein.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system to identify electronic communications, the computer system comprising:
   one or more computer readable storage devices configured to store:
   one or more software modules including computer executable instructions,
   records of first electronic communications to internal recipients within a local network for a period of time, the records reflecting, for each of the first electronic communications, a plurality of characteristics, and
   a plurality of prescreened electronic communications, at least some of the prescreened electronic communications in the first electronic communications, each prescreened electronic communication preliminarily identified as a potential undesirable electronic communication, and each prescreened electronic communication comprising the plurality of characteristics; and
   one or more hardware computer processors in communication with the one or more computer readable storage devices and configured to execute the one or more software modules in order to cause the computer system to:
   access, from the one or more computer readable storage devices, the plurality of prescreened electronic communications and the records;
   group, from the plurality of prescreened electronic communications, a data cluster of the prescreened electronic communications sharing a similar characteristic from the plurality of characteristics;
   based on a first characteristic associated with the data cluster and the same first characteristic of the records, identify recipients associated with the data cluster from the first electronic communications;
   based on one or more attributes of the data cluster, classify the data cluster with a classification reflecting a priority for assessing whether the prescreened electronic communications associated with the data cluster are undesirable electronic communications, such that, once initiated, the classifying is performed by the one or more hardware computer processors, without the need for manually performing the classifying, the classifying being based at least in part on a role of one or more of the recipients associated with the data cluster who are authorized to access the local network;
   generate user interface data for rendering an interactive user interface on a computing device, the interactive user interface including an element selectable by a user, the selectable element reflecting the classification; and
   update the user interface data such that, after the selectable element is selected by the user, the interactive user interface further includes informational data regarding the data cluster, the informational data reflecting the recipients associated with the data cluster.

2. The computer system of claim 1, the plurality of characteristics comprising a from field corresponding to a purported author of the respective first electronic communication, one or more recipient fields corresponding to the recipients of the respective first electronic communication, and a subject field corresponding to a purported topic of the respective first electronic communication.

3. The computer system of claim 1, the one or more attributes comprising the number of prescreened electronic communications in the data cluster.

4. The computer system of claim 1, the one or more attributes comprising an identity of one or more recipients of the prescreened electronic communications in the data cluster.

5. The computer system of claim 1, each prescreened electronic communication further comprising a message body, and the one or more hardware computer processors in communication with the one or more computer readable storage devices configured to execute the one or more software modules in order to cause the computer system to parse the message body for any uniform resource locators.

6. The computer system of claim 5, the one or more attributes comprising a determination that the message body includes at least one uniform resource locator.

7. The computer system of claim 5, further comprising a network connection configured to access, from one or more remote networks not within the local network, one or more domain name system blackhole lists or real-time blackhole lists, the one or more attributes comprising a determination that the message body includes at least one uniform resource locator, or a portion thereof, on the domain name system blackhole list(s) or real-time blackhole list(s).

8. The computer system of claim 5, the one or more computer readable storage devices further configured to store a log of requests from the local network seeking resources outside the local network, and the one or more hardware computer processors in communication with the one or more computer readable storage devices configured to execute the one or more software modules in order to cause the computer system to identify instances in the log indicating a request from the local network seeking a parsed uniform resource locator.

9. The computer system of claim 8, the informational data further reflecting an identification of the instances in the log.

10. The computer system of claim 1, the one or more hardware computer processors in communication with the one or more computer readable storage devices configured to execute the one or more software modules in order to further cause the computer system to receive a disposition from the user that the prescreened electronic communications associated with the data cluster are undesirable electronic communications.

11. The computer system of claim 10, the one or more hardware computer processors in communication with the one or more computer readable storage devices configured to execute the one or more software modules in order to further cause the computer system to, based on the disposition, transmit an electronic notification to the recipients associated with the data cluster.

12. A computer-implemented method to identify electronic communications, the method comprising:

as implemented by one or more computer readable storage devices configured to store one or more software modules including computer executable instructions, and by one or more hardware computer processors in communication with the one or more computer readable storage devices configured to execute the one or more software modules, accessing, from the one or more computer readable storage devices, a plurality of electronic communications of a local network, each comprising a message body, a from field corresponding to a purported author of the respective prescreened electronic communication, and a subject field corresponding to a purported topic of the respective prescreened electronic communication;

grouping, from the plurality of electronic communications, a data cluster of the electronic communications sharing a similar from field or a similar subject field;

accessing, from one or more remote networks, one or more domain name system blackhole lists or real-time blackhole lists;

for one or more of the electronic communications in the data cluster, parsing the respective message body for uniform resource locators;

based at least in part on a determination that the message body includes at least one uniform resource locator, or a portion thereof, on the domain name system blackhole list(s) or real-time blackhole list(s), classifying the data cluster with a classification reflecting a priority for assessing whether the electronic communications associated with the data cluster are undesirable electronic communications, such that, once initiated, the classifying is performed by the one or more hardware computer processors, without the need for manually performing the classifying, the classifying being based at least in part on a role of one or more recipients associated with the data cluster in the local network;

generating user interface data for rendering an interactive user interface on a computing device, the interactive user interface including an element selectable by a user, the selectable element reflecting the classification; and updating the user interface data such that, after the selectable element is selected by the user, the interactive user interface further includes informational data regarding the data cluster.

13. The computer-implemented method of claim 12, each electronic communication further comprising one or more recipient fields.

14. The computer-implemented method of claim 13, further comprising accessing records of first electronic communications to internal recipients within the local network for a period of time, the records reflecting, for each of the first electronic communications, a from field corresponding to a purported author of the respective first electronic communication, one or more recipient fields corresponding to the recipients of the respective first electronic communication, and a subject field corresponding to a purported topic of the respective first electronic communication.

15. The computer-implemented method of claim 14, further comprising, based on the from field or the subject field associated with the data cluster and the from fields or the subject fields of the records, identifying additional recipients associated with the data cluster from the first electronic communications.

16. The computer-implemented method of claim 13, the classifying further based, at least in part, on an identity of one or more the recipients of the electronic communications in the data cluster.

17. The computer-implemented method of claim 12, further comprising accessing a log of requests from the local network seeking resources outside the local network; and identifying instances in the log indicating a request from the local network seeking a parsed uniform resource locator.

18. The computer-implemented method of claim 17, the informational data comprising an identification of the instances in the log.

19. The computer-implemented method of claim 12, further comprising receiving a disposition from the user that the electronic communications associated with the data cluster are undesirable electronic communications.

20. The computer-implemented method of claim 19, further comprising, based on the disposition, transmitting an electronic notification to recipients associated with the data cluster and the additional recipients.

* * * * *